(12) United States Patent
Xie et al.

(10) Patent No.: US 11,892,345 B2
(45) Date of Patent: Feb. 6, 2024

(54) METHOD AND SYSTEM FOR DETECTING AND IDENTIFYING VIBRATION ON BASIS OF OPTICAL FIBER SIGNAL FEATURE TO DETERMINE TIME-SPACE

(71) Applicant: NEUBREX CO., LTD., Hyogo (JP)

(72) Inventors: Feng Xie, Wuxi (CN); Hongliang Cong, Wuxi (CN); Guidong Li, Wuxi (CN); Xiaohui Hu, Wuxi (CN); Longhai Xu, Wuxi (CN)

(73) Assignee: NEUBREX CO., LTD., Hyogo (JP)

( * ) Notice: Subject to any disclaimer, the term of this patent is extended or adjusted under 35 U.S.C. 154(b) by 370 days.

(21) Appl. No.: 17/418,459

(22) PCT Filed: Dec. 25, 2019

(86) PCT No.: PCT/JP2019/050799
§ 371 (c)(1),
(2) Date: Jun. 25, 2021

(87) PCT Pub. No.: WO2020/138154
PCT Pub. Date: Jul. 2, 2020

(65) Prior Publication Data
US 2021/0396573 A1   Dec. 23, 2021

(30) Foreign Application Priority Data
Dec. 29, 2018 (CN) .......................... 201811635297.3

(51) Int. Cl.
*G01H 9/00* (2006.01)
*G06N 20/10* (2019.01)
(Continued)

(52) U.S. Cl.
CPC .......... *G01H 9/004* (2013.01); *G06F 18/214* (2023.01); *G06F 18/2135* (2023.01);
(Continued)

(58) Field of Classification Search
CPC .......... G01H 9/004; G06N 20/10; G06N 5/01; G06F 18/24323; G06F 18/22; G06F 18/24137; G06F 18/2135; G06F 18/214
(Continued)

(56) References Cited

U.S. PATENT DOCUMENTS

2017/0017901 A1   1/2017  Firooz et al.
2018/0039865 A1*  2/2018  Yuan .................... G01R 31/316
(Continued)

FOREIGN PATENT DOCUMENTS

| CN | 105973449 | 9/2016 |
|----|-----------|--------|
| CN | 108509850 | 9/2018 |

(Continued)

OTHER PUBLICATIONS

Peng, Kun; et al., "Fiber optic perimeter detection based on principal component analysis," 2016 15th International Conference on Optical Communications and Networks (ICOCN), IEEE, Sep. 24, 2016, pp. 1-3 (Year: 2016).*

(Continued)

*Primary Examiner* — Jerry M Blevins
(74) *Attorney, Agent, or Firm* — Wenderoth, Lind & Ponack, L.L.P.

(57) ABSTRACT

A method for detecting and specifying a vibration on the basis of a feature of a fiber-optic signal to determine a time and a spatial location of the present invention includes: Step 1 of acquiring a feature-expanded function vector and C-number of vibration categories by expanding a feature of initial data of a vibration signal from a distributed fiber-optic sensor; Step 2 of calculating a dimensionality reduction matrix based on the feature-expanded function vector; Step 3 of acquiring a dimensionality-reduced feature function by operating the dimensionality reduction matrix to the initial data and the feature-expanded function vector; Step 4 of (Continued)

acquiring a primary classification result of the vibration signal by performing a classification with reference to primary classification parameter acquired from a parameter database; and Step 5 of acquiring and outputting a secondary classification result of the vibration signal by performing removal of a wrong detection result and correction of a wrong classification result of the primary classification result.

7 Claims, 5 Drawing Sheets

(51) Int. Cl.
  *G06F 18/22* (2023.01)
  *G06F 18/214* (2023.01)
  *G06F 18/2135* (2023.01)
  *G06F 18/2413* (2023.01)
  *G06F 18/243* (2023.01)
  *G06N 5/01* (2023.01)
(52) U.S. Cl.
  CPC ........ *G06F 18/22* (2023.01); *G06F 18/24137* (2023.01); *G06F 18/24323* (2023.01); *G06N 5/01* (2023.01); *G06N 20/10* (2019.01)
(58) Field of Classification Search
  USPC .......................................................... 385/12
  See application file for complete search history.

(56) References Cited

U.S. PATENT DOCUMENTS

| | | | |
|---|---|---|---|
| 2018/0080812 A1* | 3/2018 | Wu | ........................ G01H 9/004 |
| 2020/0191613 A1 | 6/2020 | Englund | |
| 2020/0200648 A1* | 6/2020 | Zhang | ............... G06F 18/24323 |

FOREIGN PATENT DOCUMENTS

| | | | | |
|---|---|---|---|---|
| JP | 2016-91378 | | 5/2016 | |
| JP | 2016091378 A | * | 5/2016 | ............. G05B 23/02 |
| JP | 2018-533096 | | 11/2018 | |
| WO | 2018/085893 | | 5/2018 | |

OTHER PUBLICATIONS

Peng et al., "Fiber Optic Perimeter Detection Based on Principal Component Analysis", 2016 15th International Conference on Optical Communications and Networks (ICOCN), 2016, pp. 1-3.

Jakovljević et al., "Induction Motor Broken Bar Detection using Vibration Signal Analysis, Principal Component Analysis and Linear Discriminant Analysis", 2012 IEEE International Conference on Control Applications (CCA), 2012, pp. 1686-1690.

Extended European Search Report dated Jan. 5, 2022 in corresponding European Patent Application No. 19905331.5.

International Search Report dated Mar. 17, 2020 in International (PCT) Application No. PCT/JP2019/050799.

* cited by examiner

METHOD AND SYSTEM FOR DETECTING AND IDENTIFYING VIBRATION ON BASIS OF OPTICAL FIBER SIGNAL FEATURE TO DETERMINE TIME-SPACE

TECHNICAL FIELD

The present invention belongs to the field of fiber-optic signal processing, and specifically, relates to a method and a system for detecting and specifying a vibration on the basis of a feature of a fiber-optic signal to determine a time and a spatial location.

BACKGROUND ART

Systems for detecting vibrations by use of a distributed fiber-optic sensor have been employed in the field of facility surveillance, area security, environmental measurement, and the like since they are easy to install, have a wide detection range, and an excellent detection sensitivity. However, a physical property of the distributed fiber-optic sensor causes to be difficult to associate a signal waveform acquired by the distributed fiber-optic sensor with a mechanical vibration received by the distributed fiber-optic sensor by a simple equation. Further, in the case of detecting a vibration by use of the distributed fiber-optic sensor, since there are a variety of interferences and noises in the signal of the distributed fiber-optic sensor, it is difficult to accurately detect and specify a category of the vibration to thereby determine a time and a spatial location of the vibration.

In conventional vibration detection technique using a distributed fiber-optic sensor, a vibration is detected mainly on the basis of a fluctuation amplitude of a signal of the distributed fiber-optic sensor within a predetermined time window to roughly determine a time and a spatial location. However, the vibration detection technique has not satisfied the daily increasing application demands because it has a high detection error rate, an inferiority in the specification performance of vibrations belonging to different categories, and an inferiority in the determination performance of a time and a spatial location of the vibration.

Besides, a conventional algorithm detecting and specifying a vibration on the basis of a fiber-optic signal to determine a time and a spatial location detects a fluctuation amplitude of a signal of a distributed fiber-optic sensor mainly on the basis of predetermined time window and frequency range. The algorithm determines the presence or absence of a vibration by comparing a fluctuation amplitude of a signal with a predetermined threshold value. However, since the threshold value is set on the basis of an experience of a measurer, a limitation exists in the distinction of complicated vibrations to categories based on the simple threshold, and it is difficult to maintain a balance between a wrong detection rate and a detection failure rate. Due to the problems described above, there is a limitation in applying the algorithm detecting and specifying a vibration on the basis of a fiber-optic sensor to determine a time and a spatial location to a field which requires high reliability and accuracy.

As another technique for detecting and specifying a vibration on the basis of a fiber-optic signal, there is a way comprising establishing an equation based on a logical model concerning a relationship between a signal waveform acquired by a distributed fiber-optic sensor and a mechanical vibration received by the distributed fiber-optic sensor, and acquiring a signal feature and a reference threshold value which are necessary to be extracted to detect a vibration. However, a plurality of nonlinear conversions is made in the process from a mechanical vibration to a fiber-optic sensor signal. Therefore, the logical analysis can be applied only to a predetermined simple vibration. Additionally, the logical model uses a large number of approximations, which results in omission of various distortions of the signal feature which occur in an actual process to the fiber-optic sensor signal. Accordingly, the logical model involves large errors, and is disadvantageous in the detection and specification.

SUMMARY OF INVENTION

The present invention has been made in view of the above circumstances, and an object thereof is to provide a method and a system for detecting and specifying a vibration on the basis of a feature of a fiber-optic signal to determine a time and a spatial location which can improve an accuracy in detecting and specifying the vibration.

According to an aspect of the present invention, a method for detecting and specifying a vibration on the basis of a feature of a fiber-optic signal to determine a time and a spatial location comprises: Step 1 of acquiring a feature-expanded function vector and C-number of vibration categories by expanding a feature of initial data of a vibration signal from a distributed fiber-optic sensor; Step 2 of calculating a dimensionality reduction matrix based on the feature-expanded function vector; Step 3 of acquiring a dimensionality-reduced feature function by operating the dimensionality reduction matrix to the initial data and the feature-expanded function vector; Step 4 of acquiring a primary classification result of the vibration signal by performing a classification with reference to a primary classification parameter acquired from a parameter database; and Step 5 of acquiring and outputting a secondary classification result of the vibration signal by performing removal of a wrong detection result and correction of a wrong classification result of the primary classification result.

According to another aspect of the present invention, a system for detecting and specifying a vibration on the basis of a feature of a fiber-optic signal to determine a time and a spatial location comprises: a feature expansion unit for acquiring a feature-expanded function vector and C-number of vibration categories by expanding a feature of initial data of a vibration signal from a distributed fiber-optic sensor; a dimensionality reduction matrix calculation unit for calculating a dimensionality reduction matrix based on the feature-expanded function vector; a linear dimensionality reduction unit for acquiring a dimensionality-reduced feature function by operating the dimensionality reduction matrix to the initial data and the feature-expanded function vector; a primary classification unit for acquiring a primary classification result of the vibration signal by performing a classification with reference to a primary classification parameter acquired from a parameter database; and a secondary classification unit for acquiring and outputting a secondary classification result of the vibration signal by performing removal of a wrong detection result and correction of a wrong classification result of the primary classification result.

The objects, features, aspects, and advantages of the present invention will be more apparent from the following detailed description and drawings.

DESCRIPTION OF EMBODIMENTS

All the terms (including technical terms and scientific terms) recited in the present specification convey the same meanings as what are generally understood by a person skilled in the art unless they are separately defined in the present specification. Further, the terms defined in a dictionary versatilely used convey the same meanings as what are used in the prior art, and should not be interpreted in an idealized meaning or an excessively formal meaning unless they are specifically defined in the present specification.

The present invention provides a novel algorithm configuration which can solve problems pertaining to conventional algorithms for detecting and specifying a vibration on the basis of a fiber-optic signal to determine a time and a spatial location. The configuration includes a training part and a detecting-specifying part. The training part executes a statistical analysis to initial fiber-optic signals collected through experiments, acquires a feature to detect and specify a vibration, and extracts it as an algorithm parameter. The detecting-specifying part detects a vibration on the basis of the parameter acquired by the training part according to a predetermined signal processing sequence, specifies a category of the vibration, and completes determination of a time and a spatial location of the vibration.

The algorithm configuration provided according to the present invention is based on a statistical parameter of fiber-optic signal data collected through experiments. This enables the algorithm to accurately treat interferences and/or noises encountered in detecting and specifying a vibration, and also avoid the problem of model error occurring in the method for detecting and specifying a vibration on the basis of a logical model.

A vibration detected and specified according to the present invention is, for example, an environmental vibration caused by a pedestrian, an automobile, a train, wind, rain, snow, or the like. Further, a field to which the present invention is applied is: for example, excavation prevention, theft prevention, and/or leakage prevention in a petrol/gas pipeline; leakage prevention in a petrol/gas well; water-flow disturbance detection and/or geophysical exploration; intrusion prevention in public facilities such as a train, an airport, and a museum; security protection and security measures in a governmental/national buildings such as a city hall, a prison, and a military base; or intrusion prevention along a border and prevention of illegal border transgression.

Hereinafter, preferable embodiments of the present invention will be described in detail with reference to the drawings. However, the present invention is not limited to the embodiments.

Figure 1:
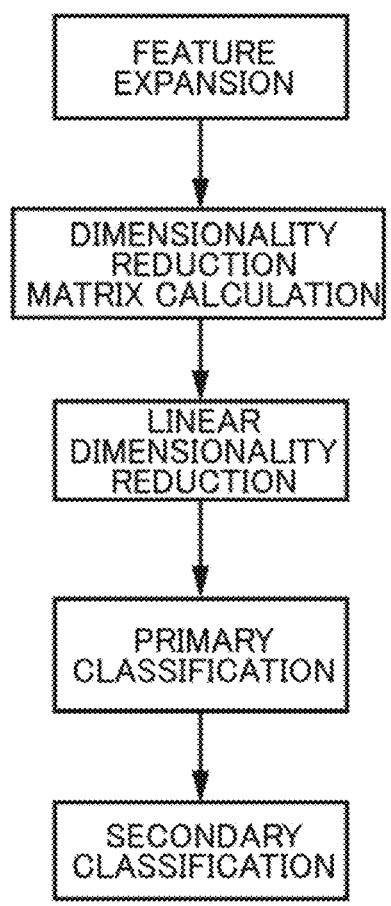
FIG. 1 is a flowchart of a method according to an embodiment of the present invention.

FIG. 1 is a flowchart showing a method according to an embodiment of the present invention. As shown in FIG. 1, the method includes Step 1 (feature expansion step), Step 2 (dimensionality reduction matrix calculation step), Step 3 (linear dimensionality reduction step), Step 4 (primary classification step), and Step 5 (secondary classification step).

[Step 1 (Feature Expansion Step)]

In Step 1, a feature-expanded function vector is acquired by expanding a feature of initial data of a vibration signal from a distributed fiber-optic sensor. The vibration signal, which is an input data acquired by the distributed fiber-optic sensor, is interpreted as a quadratic function f(t, d) concerning a relationship between a time t and a spatial location d. In this step, the vibration signal f(t, d), which is an input data, is converted into a plurality of feature-expanded functions by a nonlinear conversion. The following functions (1) to (8) can be raised as specific examples of the feature-expanded functions.

(1) Translation of the initial signal with respect to time, for example, $g_1(t, d) = f(t-T, d)$;

(2) Translation of the initial signal with respect to space, for example, $g_2(t, d) = f(t, d-D)$;

(3) Exponent of the initial signal, for example, $g_3(t, d) = [f(t, d)]^r$;

(4) Component of the initial signal in a frequency band $F_0$, for example, $g_4(t, d) = LPF\{f(t, d)\cos(2\pi F_0 t)\}$;

(5) Product of the feature-expanded functions, for example, $g_5(t, d) = g_1(t, d)g_2(t, d)$;

(6) Product of a feature-expanded function and the initial signal, for example, $g_6(t, d) = g_4(t, d)f(t, d)$;

(7) Partial average values of a time and a spatial location of the initial signal, for example, $$g_7(t, d) = \frac{1}{(2N+1)(2M+1)} \sum_{n=-N}^{N} \sum_{m=-M}^{M} f(t-n, d-m)$$

where, in the equation, N denotes a maximum value in a time domain, and M denotes a maximum value in a spatial location; and (8) Partial covariance of the initial signal with respect to space, for example, $$g_8(t, d) = \frac{1}{(2N+1)(2M+1)} \sum_{n=-N}^{N} \sum_{m=-M}^{M} f^2(t-n, d-m) - g_7^2(t, d).$$

Among the feature-expanded functions (1) to (8), for example, a nonlinearity can be introduced in the initial data by the function $g_3(t, d)$ or $g_6(t, d)$. On the other hand, for example, data within predetermined time window and space window can be associated with each other by the function $g_1(t, d)$, $g_2(t, d)$, $g_5(t, d)$, $g_7(t, d)$, or $g_8(t, d)$. As a result, the accuracy in detecting and specifying a vibration can be improved. The functions (1) to (8) are nothing more than examples of feature-expanded functions. Further, in Step 1, a feature-expanded function vector g (t, d) is formed by combining the feature-expanded functions.

[Step 2 (Dimensionality Reduction Matrix Calculation Step)]

In the step subsequent to Step 1, a calculation of dimensionality reduction matrix is required to reduce the dimensionality of the feature-expanded function vector. Accordingly, in Step 2, the dimensionality reduction matrix W is calculated by executing the statistical analysis to the feature on the basis of the feature-expanded function vector g(t, d). The calculation way is in accordance with Fisher's linear discriminant, which is a linear dimensionality reduction algorithm. Sub-steps 21 to 23, which are specific examples, are described below.

(Sub-Step 21)

First, $K_c$-number of training sample sets represented by the following equations are collected for each vibration mode c regarding a vibration (including non-vibration) in the category C to be classified. The training sample set is acquired from a value of a feature-expanded function vector g(t, d) representing a relationship between a time t and a spatial location d corresponding to the vibration category c.

Training Sample Set: $\{g_1^{(c)}, g_2^{(c)}, \ldots, g_{K_c}^{(c)}\}$

Wherein $g_k^{(c)}$ denotes a $k^{-th}$ training sample in vibration category c.

(Sub-Step 22)

Second, the following statistical amounts are calculated for each vibration category.

$$\text{Center of a cluster: } \bar{g}^{(c)} = \frac{1}{K_c}\sum_{k=1}^{K_c} g_k^{(c)}$$

$$\text{Variance with in the cluster: } S^{(c)} = \sum_{k=1}^{K_c} (g_k^{(c)} - \bar{g}^{(c)})(g_k^{(c)} - \bar{g}^{(c)})^T$$

$$\text{Sum of variances within clusters: } S_\Sigma = \sum_{c=1}^{C} S^{(c)}$$

$$\text{Center of all the data: } \bar{g} = \frac{1}{\sum_{c=1}^{C} K_C} \sum_{c=1}^{C}\sum_{k=1}^{K_c} g_k^{(c)}$$

$$\text{Variance between clusters: } S = \sum_{c=1}^{C} K_C (\bar{g} - \bar{g}^{(c)})(\bar{g} - \bar{g}^{(c)})^T$$

(Sub-Step 23)

Third, the feature values of the matrix represented by the following equation are calculated and decomposed. Subsequently, a feature vector corresponding to Q-number of maximum feature values is acquired. Columns in the dimensionality reduction matrix W are constituted by feature vectors.

Matrix: $S_\Sigma^{-1} S$

The algorithm is an example for achieving a linear dimensionality reduction matrix. In a method according to the embodiment of the present invention, the other linear dimensionality reduction algorithms such as Principal Component Analysis (PCA) and Independent Component Analysis (ICA) may be used in place of the aforementioned algorithms.

[Step 3 (Linear Dimensionality Reduction Step)]

In Step 3, the initial data of the vibration signal and the previously acquired feature-expanded functions $\{f(t, d), g_1(t, d), g_2(t, d), g_3(t, d), \ldots g_{P-1}(t, d)\}$ are linearly combined and compressed, and a predetermined number of dimensionality-reduced feature functions $\{h_1(t, d), h_2(t, d), h_3(t, d), \ldots h_Q(t, d)\}$ is acquired. The dimensionality reduction result can be acquired from a matrix equation represented by the following equation.

$$W^T g(t,d) = h(t,d)$$

Wherein g(t, d) is a function column vector of a size P×1, $g(t, d) = [f(t, d)\ g_1(t, d)\ g_2(t, d)\ g_3(t, d)\ \ldots\ g_{P-1}(t, d)]^T$, h(t, d) is a function vector of a size Q×1, $h(t,d) = [h_1(t,d)\ h_2(t,d)\ h_3(t,d)\ \ldots\ h_Q(t, d)]^T$, the dimensionality reduction matrix W is a numerical matrix of a size P×Q, the vector h(t, d) has a size smaller than g(t, d), and Q<P.

[Step 4 (Primary Classification Step)]

In Step 4, the feature vector h(t, d) having been subjected to the dimensionality reduction is input in a classifier (hereinafter, also referred to as "primary classifier") which has been subjected to the training and contains a control parameter, and a vibration category c is output. The value of the vibration category c may be set as c=1, 2, . . . , C, and the category c=1 means no vibration. A decision tree classifier may be used as the classifier. However, a classifier containing a neural network or a support vector machine (SVM) may be used. Since a variety of trainers are described in the machine learning theory, no further description is made here. The control parameter of the classifier is acquired through the training. In the training of parameter, a training sample set $\{(h_1, c_1), (h_2, c_2), (h_3, c_3), \ldots \}$ of the vibration in category C to be classified is input. Here, $(h_k, c_k)$ represents a training sample in a vibration category $c_k$, and $h_k$ denotes a value in a feature function vector h(t, d) which corresponds to an occurrence time t and a spatial location d of the vibration in the current category and has been subjected to the dimensionality reduction. The specific algorithm configuration corresponds to the primary classifier, for example, a decide tree trainer, a neural network trainer, and a support vector machine trainer.

Step 4 is performed to achieve the primary classification. An error which is contained in the output in Step 4 is removed in the secondary classification in the subsequent Step.

[Step 5 (Secondary Classification Step)]

In Step 5, the primary classification result e(t, d) acquired in Step 4 is improved. The improvement includes removal of a wrongly detected vibration and/or correction of a wrongly classified vibration. In an actual processing, the vibration continuing time and/or the concerning spatial area is large depending on a category difference, and liable to exceed the area covered by the feature-expanded function. Therefore, it is required to execute a secondary analysis by use of a classification result in a broader time and spatial ranges from a higher dimensionality. Sub-steps 51 to 53, which are specific examples, are described below.

(Sub-Step 51)

First, the primary classification result e(t, d) acquired in Step 4 is converted into a logical variable represented by the following equation. The logical variable is a single sequence variable consisting of the values of 0 and 1.

$$\text{Logical variable: } L_{m,n}^{(i)} = \begin{cases} 1 & \text{if } e(t-m, d-n) == i \\ 0 & \text{otherwise} \end{cases}$$

Wherein $L_{m,n}^{(i)}$ denotes a logical variable when a fiber-optic signal at a time (t−m) and a location (d−n) is determined to be a vibration of category i by the primary classifier.

(Sub-Step 52)

Second, a score is calculated for each vibration category on the basis of a logical rule in a logical rule base.

Here, each logical rule includes the following definitions (a) and (b).

(a) A logical equation is represented by $J_b(L)$, wherein the input L is the entirety of the logical variable $L_{m,n}^{(i)}$, and the subscript b denotes the $b^{-th}$ logical equation.

(b) When the logical equation $J_b(L)$ is established, a contribution degree to a score of each vibration category is $s_b^{(c)}$. Namely, $s_b^{(c)}$ denotes a contribution degree to a score of a vibration in category c when the $b^{-th}$ logical equation is established.

With respect to B-number of whole logical equations $\{J_1(L), J_2(L), \ldots, J_B(L)\}$, a score $s^{(c)}$ when the current vibration signal belongs to category c is calculated in the equation $s^{(c)} = \Sigma_{b=1}^{B} J_b(L) s_b^{(c)}$.

(Sub-Step 53)

Third, the vibration category corresponding to a highest score represented by the following equation is output.

$$e^*(t,d) = \text{argmax}_c s^{(c)}$$

Here, two specific examples $J_1(L)$ and $J_2(L)$ are shown in order to describe a specific formation of this logical equation.

$$J_1(L) = L_{0,0}^{(1)} \text{ and } (L_{1,0}^{(1)} \text{ or } L_{2,0}^{(1)})$$

$$J_2(L) = L_{0,0}^{(5)} \text{ and } L_{0,1}^{(5)} \text{ and } L_{0,-1}^{(5)}$$

$J_1(L)$ represents a logical event when a vibration in category 1 is detected by the first classifier at a current time, a preceding time or a time preceding the preceding time.

$J_2(L)$ represents a logical event when a vibration in category 5 is detected by the first classifier at a current location and adjacent locations in front of and behind the current location.

Figure 2:
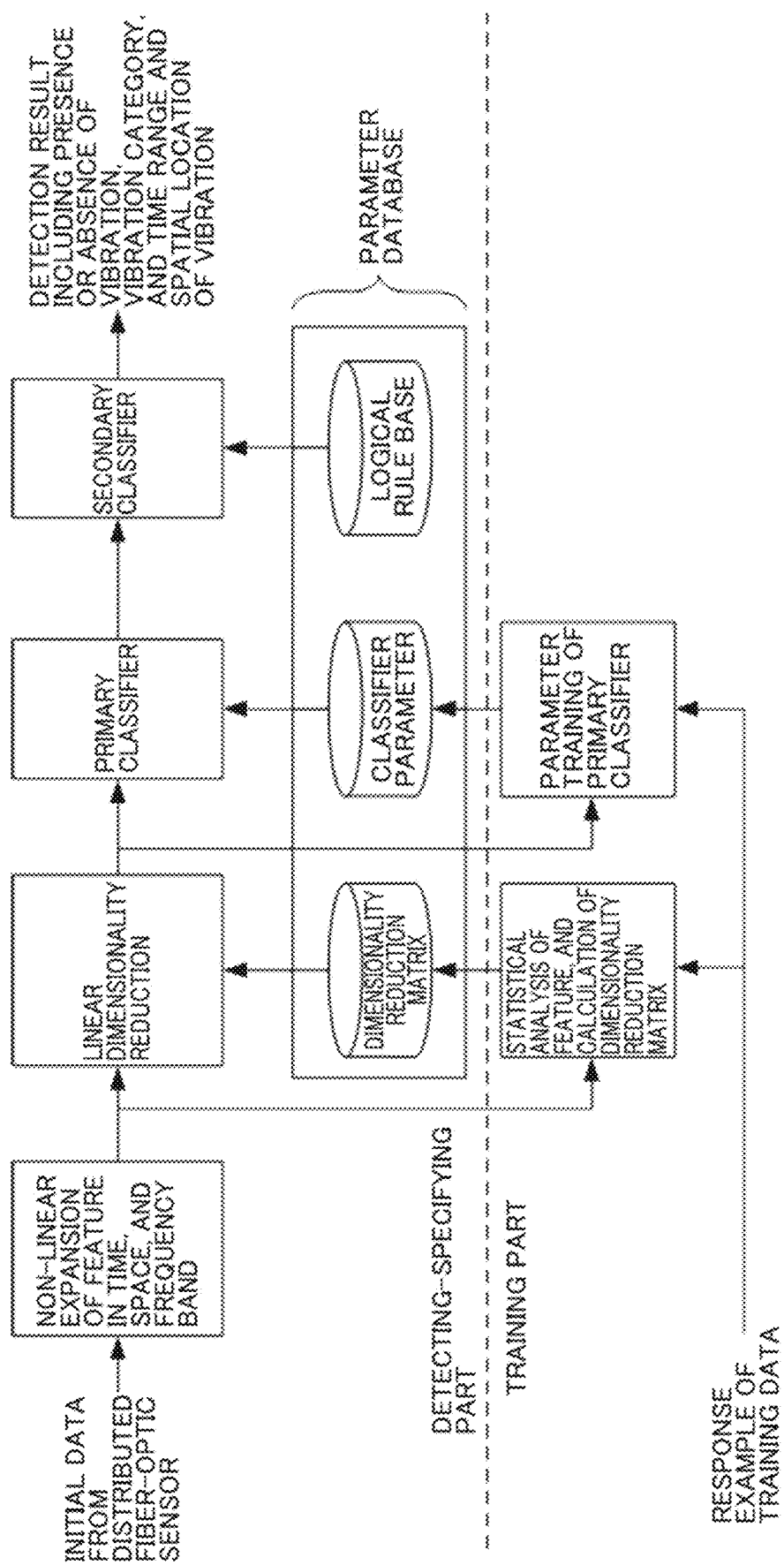
FIG. 2 is a block diagram of a system according to an embodiment of the present invention.

FIG. 2 is a block diagram (a schematic diagram of a function module) of a system according to an embodiment of the present invention. The system corresponds to the method described in the embodiment. Specifically, a system according to the embodiment of the present invention is for detecting and specifying a vibration on the basis of a feature of a fiber-optic signal to determine a time and a spatial location, and comprises: a feature expansion unit for acquiring a feature-expanded function vector and C-number of vibration categories by expanding a feature of initial data of a vibration signal from a distributed fiber-optic sensor; a dimensionality reduction matrix calculation unit for calculating a dimensionality reduction matrix based on the feature-expanded function vector; a linear dimensionality reduction unit for acquiring a dimensionality-reduced feature function by operating the dimensionality reduction matrix to the initial data and the feature-expanded function vector; a primary classification unit for acquiring a primary classification result of the vibration signal by performing a classification with reference to a primary classification parameter acquired from a parameter database; and a secondary classification unit for acquiring and outputting a secondary classification result of the vibration signal by performing removal of a wrong detection result and correction of a wrong classification result of the primary classification result.

The system may further comprise a parameter database. The parameter database is used to accumulate at least one of the dimensionality reduction matrix, a classifier parameter, and a logical rule base.

As described above, one aspect of the present invention is directed to a method for detecting and specifying vibrations on the basis of a feature of a fiber-optic signal to determine a time and a spatial location comprising: Step 1 (feature expansion step) of acquiring a feature-expanded function vector and C-number of vibration categories by expanding a feature of initial data of a vibration signal from a distributed fiber-optic sensor; Step 2 (dimensionality reduction matrix calculation step) of calculating a dimensionality reduction matrix based on the feature-expanded function vector; Step 3 (linear dimensionality reduction step) of acquiring a dimensionality-reduced feature function by operating the dimensionality reduction matrix to the initial data and the feature-expanded function vector; Step 4 (primary classification step) of acquiring a primary classification result of the vibration signal by performing a classification with reference to a primary classification parameter acquired from a parameter database; and Step 5 (secondary classification step) of acquiring and outputting a secondary classification result of the vibration signal by performing removal of a wrong detection result and correction of a wrong classification result of the primary classification result.

In the method described above, Step 2 preferably includes: Sub-step 21 of collecting a training sample set represented by the following Equation 1 for vibration category c; Sub-step 22 of calculating, for each vibration category, a center of a cluster represented by the following Equation 2, a variance within the cluster represented by the following Equation 3, a sum of variances within clusters represented by the following Equation 4, a center of all the data represented by the following Equation 5, and a variance between clusters represented by the following Equation 6; and Sub-step 23 of calculating a feature value of a matrix represented by the following Equation 7, decomposing the matrix, acquiring Q-number of maximum feature values and corresponding feature vectors, and composing the dimensionality reduction matrix by using columns of the feature vectors.

$$\text{Training sample set: } \{g_1^{(c)}, g_2^{(c)}, \ldots, g_{K_c}^{(c)}\} \quad \text{(Equation 1)}$$

In Equation 1, $g_k^{(c)}$ denotes a $k^{-th}$ training sample in vibration category c.

$$\text{Center of a cluster: } \bar{g}^{(c)} = \frac{1}{K_c} \sum_{k=1}^{K_c} g_k^{(c)} \quad \text{(Equation 2)}$$

In Equation 2, Kc denotes the number of training samples in the category c.

$$\text{Variance within a cluster: } S^{(c)} = \Sigma_{k=1}^{K_c}(g_k^{(c)} - \bar{g}^{(c)})(g_k^{(c)} - \bar{g}^{(c)})^T \quad \text{(Equation 3)}$$

$$\text{Sum of variances within clusters: } S_\Sigma = \Sigma_{c=1}^{C} S^{(c)} \quad \text{(Equation 4)}$$

In Equation 4, C denotes the total number of vibration categories.

$$\text{Center of all the data: } \bar{g} = \frac{1}{\sum_{c=1}^{C} K_C} \sum_{c=1}^{C} \sum_{k=1}^{K_c} g_k^{(c)} \quad \text{(Equation 5)}$$

$$\text{Variance between clusters: } S = \sum_{c=1}^{C} K_C (\bar{g} - \bar{g}^{(c)})(\bar{g} - \bar{g}^{(c)})^T \quad \text{(Equation 6)}$$

$$\text{Matrix: } S_\Sigma^{-1} S \quad \text{(Equation 7)}$$

In the method described above, in Step 2, the dimensionality reduction matrix is preferably acquired by Principal Component Analysis or Independent Component Analysis.

In the method described above, Step 5 preferably includes: Sub-step 51 of converting the primary classification result represented by the following Equation 8 to a logical variable represented by the following Equation 9; Sub-step 52 of calculating, for each vibration category, a score of B-number of whole logical equations $\{J_1(L), J_2(L), \ldots, J_B(L)\}$ in a logical rule base on the basis of a calculation equation represented by the following Equation 10; and Sub-step 53 of outputting a vibration category corresponding to a highest score represented by the following Equation 11 as an output of a secondary classifier.

Primary Classifitation Result: $e(t, d)$ (Equation 8)

Logical Variable: $L_{m,n}^{(i)} = \begin{cases} 1 & \text{if } e(t-m, d-n) == i \\ 0 & \text{otherwise} \end{cases}$ (Equation 9)

In Equation 9, $L_{m,n}^{(i)}$ denotes a logical variable when a fiber-optic signal at a time (t−m) and a location (d−n) is determined to be a vibration of category i in Step 4.

Calculation Equation: $s^{(c)} = \sum_{b=1}^{B} J_b(L) s_b^{(c)}$ (Equation 10)

In Equation 10, $s^{(c)}$ denotes a score on the basis of the whole logical equations in the logical rule base when the current vibration belongs to category c, wherein the input L in $J_b(L)$ configures all the logical variables $L_{m,n}^{(i)}$, the subscript b denotes the $b^{-th}$ logical equation, and $s_b^{(c)}$ denotes a contribution degree to a score in each vibration category when the logical equation $J_b(L)$ is established.

Vibration category corresponding to a highest score $e*$ (Equation 11)
$(t, d) = \text{argmax}_c s^{(c)}$ Another aspect of the present invention is directed to a system for detecting and specifying a vibration on the basis of a feature of a fiber-optic signal to determine a time and a spatial location comprising: a feature expansion unit for acquiring a feature-expanded function vector and C-number of vibration categories by expanding a feature of initial data of a vibration signal from a distributed fiber-optic sensor; a dimensionality reduction matrix calculation unit for calculating a dimensionality reduction matrix based on the feature-expanded function vector; a linear dimensionality reduction unit for acquiring a dimensionality-reduced feature function by operating the dimensionality reduction matrix to the initial data and the feature-expanded function vector; a primary classification unit for acquiring a primary classification result of the vibration signal by performing a classification with reference to a primary classification parameter acquired from a parameter database; and a secondary classification unit for acquiring and outputting a secondary classification result of the vibration signal by performing removal of a wrong detection result and correction of a wrong classification result of the primary classification result.

In the system, the parameter database is preferably used to accumulate at least one of the dimensionality reduction matrix, a classifier parameter, and a logical rule base.

The present invention has the following technical advantageous effects.

The present invention introduces a nonlinearity in the initial data by nonlinearly expanding a feature in the time, space, and frequency band, and associates data within predetermined time window and space window with each other. Consequently, a vibration signal in a single field of time and space is not analyzed as a single point by a classifier, but is analyzed and classified in combination in the subsequent processing. As a result, the feature expansion improves the accuracy in detecting a vibration in the present invention.

Besides, the present invention adopts a two-stage specification way in specifying a vibration category. In the first stage, a primary classification of a vibration category is performed by use of an expanded feature data. In the second stage, the result of the primary classification is improved in accordance with a logical rule. Specifically, vibration detection results within relatively broad time and spatial ranges are associated with each other in accordance with a predetermined logical rule to thereby eliminate a specification error caused by an occasional interference and a wrong specification. This improves the accuracy in specifying a vibration in the present invention.

Further, in the present invention, statistical classification technologies and classification experiences in the field of fiber-optic signal detection are effectively combined in the two-stage specification-classification way. This secures the accuracy of a specification algorithm in the present invention.

According to the present invention, for example, when detecting and specifying an environmental vibration on a railroad by use of a four-tiered decision tree classifier, the high reliability and accuracy were made that the space specification rate was ±10 m; the response time to a vibration was three seconds or less; the wrong detection in a week occurred one or less a day; and the detection failure in a week occurred zero. In contrast, when detecting and specifying an environmental vibration on a railroad by an artificial intelligence (AI), the poor reliability and accuracy were made that the wrong detection in a week occurred twelve or more a day. As it can be seen, the present invention can relatively promptly and also accurately detect and specify a vibration and determine a time and a spatial location in a smaller amount of training data than AI.

Hereinafter, the present invention will be further specifically described by way of Examples. However, the scope of the present invention is not limited to the Examples.

Examples

Figure 3:
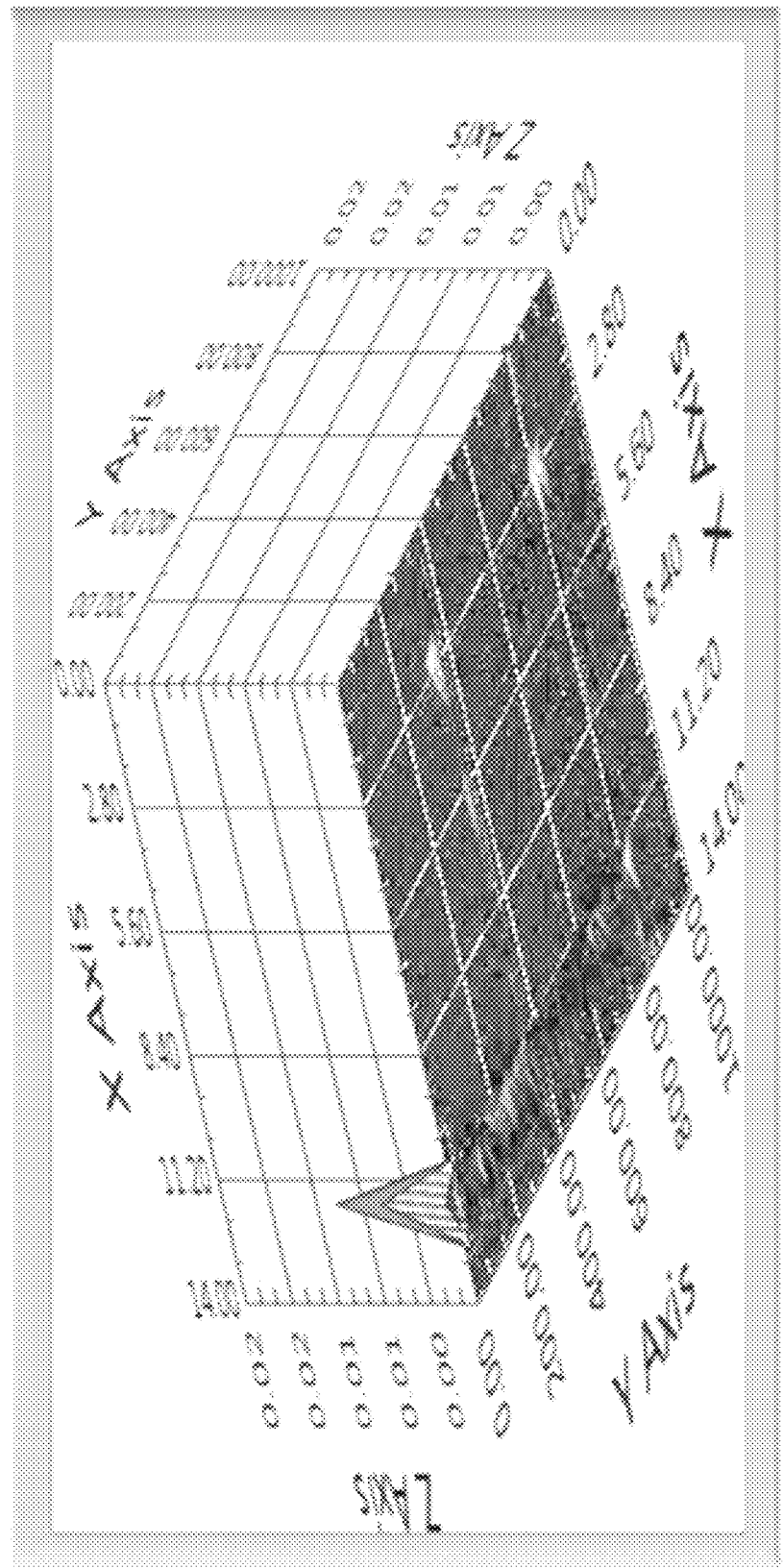
FIG. 3 is a diagram showing a vibration signal occurring in a case of climbing a fence in an Example.
Figure 4:
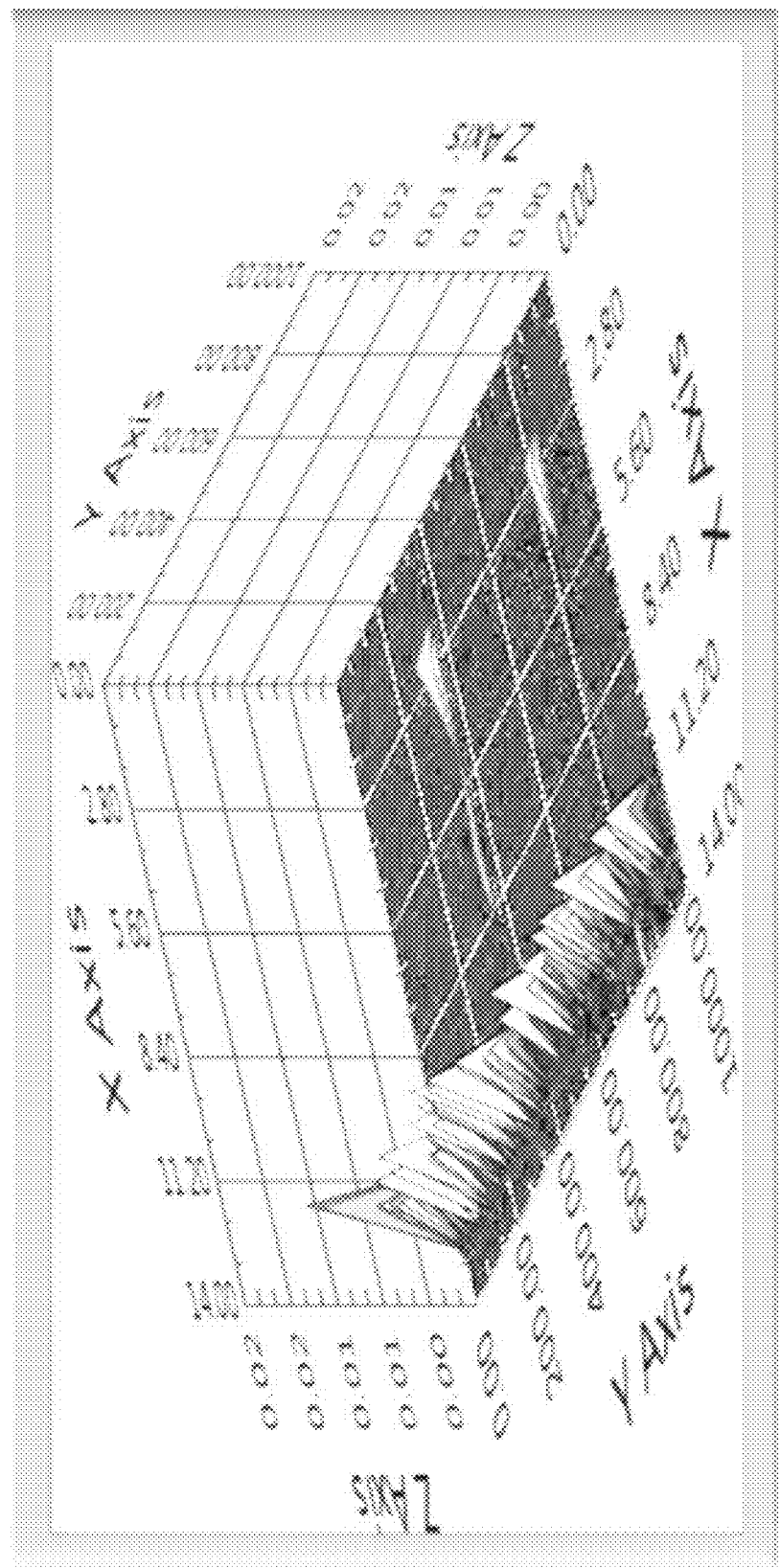
FIG. 4 is a diagram showing a vibration signal occurring in a case of striking a fence in the Example.
Figure 5:
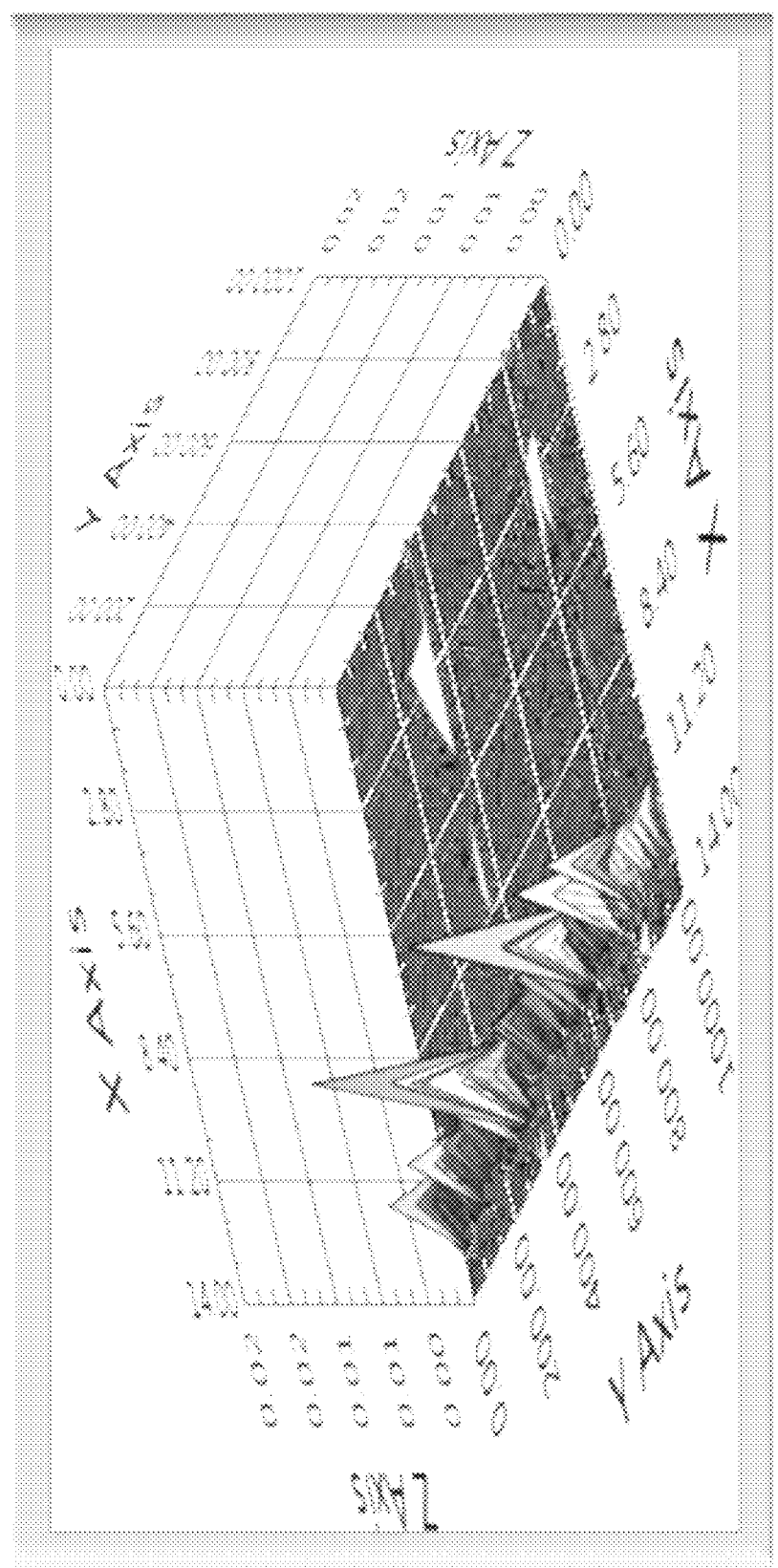
FIG. 5 is a diagram showing a vibration signal occurring in a case of intersecting an optical fiber in the Example.

The present invention was applied to an area security system to distinguish vibrations caused by three types of intrusive actions (namely, fence climbing, fence striking, and optical fiber intersection) defined in the area security system. Detection signals in the three types of invasive actions are shown in FIGS. 3 to 5. More specifically, FIG. 3 is a diagram showing a vibration signal occurring in the case of climbing a fence in this Example. FIG. 4 is a diagram showing a vibration signal occurring in the case of striking a fence in this Example. FIG. 5 is a diagram showing a vibration signal occurring in the case of intersecting an optical fiber in this Example. In these drawings, the X axis represents a location on the optical fiber, the Y axis represents a vibration frequency, and the Z axis represents a vibration intensity.

As shown in FIGS. 3 to 5, quite remarkable differences were observed between feature vectors corresponding to motions of the different intrusive actions. Specifically, in the case of climbing a fence, the energy distribution is mainly concentrated in a low frequency band in the frequency range. However, in the case of striking a fence, the energy distribution is relatively shifted to a high frequency side compared with the case of climbing the fence. Additionally, in the case of intersecting an optical fiber, the energy distribution is mainly in a high frequency band. The feature vectors corresponding to the motions of the three types of intrusive actions have the significant differences from one another. Thus, these differences could be seen to be usable as an effective training for a feature vector.

Accordingly, a great number of experiments on the three types of intrusive actions was conducted, and the collected fiber-optic sensing data were used as training data. Specifically, sequentially arrayed 19991 pieces of csv data (100 columns) were collected in a given time, and were composited into a csv file with 19991 rows×100 columns to thereby obtain an initial feature data file "feature.csv" of the events. Subsequently, a csv file "target.csv" with the same number of rows and columns as the file "feature.csv" was produced. All the data in the file "target.csv" was allotted with "0" at the initial place, and the twelfth channel was used as an experimental event occurrence channel based on experimental records and data comparison. The twelfth column of the file "target.csv" was allotted with event data. Specifically, as an event data, "1" was allotted to the case of climbing a fence, "2" to the case of striking a fence, and "3" to the case of intersecting an optical fiber, respectively. When extracting a result on the basis of the feature, the following feature expansion equations were used.

$F1=\text{input}(\text{'C:/work/Fiber}/dt\_\text{tree/data/feature.csv'})$ $F2=F1.\text{time\_shift}(1)$ $F3=F1.\text{time\_shift}(2)$ $F4=F1.\text{time\_shift}(3)$ $F5=F1.\text{time\_shift}(-2)$ $F6=F1.\text{time\_shift}(-4)$ $F7=F1.\text{time\_shift}(-8)$ $F8=F1.\text{channel\_shift}(4)$ $F9=F1.\text{channel\_shift}(5)$ $F10=F1.\text{channel\_shift}(6)$ $F11=F1.\text{channel\_shift}(-1)$ $F12=F1.\text{channel\_shift}(-2)$ $F13=F1.\text{channel\_shift}(-3)$ After having executed the algorithm program, the generated decide tree was applied to the area security system, and numerous detection tests were conducted. The results are shown below.

First, in detection test of 2000 fence climbings, 11 detection failures and 21 wrong detections occurred. The wrong detections included 6 detections as fence striking action and 15 detections as optical fiber intersecting action.

Next, in detection tests of 2000 fence strikings, 5 detection failures and 13 wrong detections occurred. The wrong detections included 3 detections as fence climbing action and 10 detections as optical fiber intersecting action.

Further, in detection tests of 2000 optical fiber intersections, 3 detection failures and 31 wrong detections occurred. The wrong detections included 26 detections as fence climbing action and 5 detections as fence striking action.

The whole error rate is: $((11+21)+(5+13)+(3+31))/(2000+2000+2000)\times 100=1.4\%$. Consequently, the category classification of the three types of intrusive actions that is required for an area security system was confirmed to be established.

The present application is based on Chinese Patent Application No. 201811635297.3 filed on Dec. 29, 2018, and the contents of which are incorporated in the present application.

The present invention was suitably and fully described above by means of embodiments in order to express the present invention. However, it should be recognized that a person skilled in the art would be able to easily modify and/or improve the embodiments described above. Accordingly, a modified embodiment or an improved embodiment achieved by the person skilled in the art are construed to be comprehended in the protection scope of Claims as long as the modified embodiment or the improved embodiment do not deviate from the protection scope of Claims.

The invention claimed is:

1. A method for detecting and specifying a vibration on the basis of a feature of a fiber-optic signal to determine a time and a spatial location, comprising:

Step 1 of acquiring a feature-expanded function vector and C-number of vibration categories by expanding a feature of initial data of a vibration signal from a distributed fiber-optic sensor;

Step 2 of calculating a dimensionality reduction matrix based on the feature-expanded function vector;

Step 3 of acquiring a dimensionality-reduced feature function by operating the dimensionality reduction matrix to the initial data and the feature-expanded function vector;

Step 4 of acquiring a primary classification result of the vibration signal by performing a classification with reference to a primary classification parameter acquired from a parameter database; and Step 5 of acquiring and outputting a secondary classification result of the vibration signal by performing removal of a wrong detection result and correction of a wrong classification result of the primary classification result, wherein Step 2 includes:

Sub-step 21 of collecting a training sample set represented by the following Equation 1 for vibration category c;

Sub-step 22 of calculating, for each vibration category, a center of a cluster represented by the following Equation 2, a variance within the cluster represented by the following Equation 3, a sum of variances within clusters represented by the following Equation 4, a center of all the data represented by the following Equation 5, and a variance between clusters represented by the following Equation 6; and Sub-step 23 of calculating a feature value of a matrix represented by the following Equation 7, decomposing the matrix, acquiring Q-number of maximum feature values and corresponding feature vectors, and composing the dimensionality reduction matrix by using columns of the feature vectors, Training sample set: $\{g_1^{(c)}, g_2^{(c)}, \ldots, g_{K_c}^{(c)}\}$, (Equation 1)

where, in Equation 1, $g_k^{(c)}$ denotes a k-$^{th}$ training sample in vibration category c, Center of a cluster: $\bar{g}^{(c)} = \frac{1}{K_c} \sum_{k=1}^{K_c} g_k^{(c)}$, (Equation 2)

where, in Equation 2, Kc denotes the number of training samples in the category c, Variance within the cluster: (Equation 3)

$S^{(c)} = \sum_{k=1}^{K_c} (g_k^{(c)} - \bar{g}^{(c)})(g_k^{(c)} - \bar{g}^{(c)})^T$, Sum of variances within clusters: $S_\Sigma = \sum_{c=1}^{C} S^{(c)}$, (Equation 4)

where, in Equation 4, C denotes the total number of vibration categories,

Center of all of the data: $\bar{g} = \frac{1}{\sum_{c=1}^{C} K_c} \sum_{c=1}^{C} \sum_{k=1}^{K_c} g_k^{(c)}$, (Equation 5)

Variance between clusters: $S = \sum_{c=1}^{C} K_c (\bar{g} - \bar{g}^{(c)})(\bar{g} - \bar{g}^{(c)})^T$, (Equation 6)

Matrix: $S_\Sigma^{-1} S$. (Equation 7)

2. The method for detecting and specifying a vibration on the basis of a feature of a fiber-optic signal to determine a time and a spatial location according to claim 1, wherein
in Step 2, the dimensionality reduction matrix is acquired by Principal Component Analysis or Independent Component Analysis.

3. A method for detecting and specifying a vibration on the basis of a feature of a fiber-optic signal to determine a time and a spatial location comprising:
Step 1 of acquiring a feature-expanded function vector and C-number of vibration categories by expanding a feature of initial data of a vibration signal from a distributed fiber-optic sensor;
Step 2 of calculating a dimensionality reduction matrix based on the feature-expanded function vector;
Step 3 of acquiring a dimensionality-reduced feature function by operating the dimensionality reduction matrix to the initial data and the feature-expanded function vector;
Step 4 of acquiring a primary classification result of the vibration signal by performing a classification with reference to a primary classification parameter acquired from a parameter database; and
Step 5 of acquiring and outputting a secondary classification result of the vibration signal by performing removal of a wrong detection result and correction of a wrong classification result of the primary classification result, wherein
Step 5 includes:
Sub-step 51 of converting the primary classification result represented by the following Equation 8 to a logical variable represented by the following Equation 9;
Sub-step 52 of calculating, for each vibration category, a score of B-number of whole logical equations $\{J_1(L), J_2(L), \ldots, J_B(L)\}$ in a logical rule base on the basis of a calculation equation represented by the following Equation 10; and
Sub-step 53 of outputting a vibration category corresponding to a highest score represented by the following Equation 11 as an output of a secondary classifier, Primary Classification Result: $e(t, d)$, (Equation 8)

Logical Variable: $L_{m,n}^{(t)} = \begin{cases} 1 & \text{if } e(t-m, d-n) == i \\ 0 & \text{otherwise} \end{cases}$, (Equation 9)

where, in Equation 9, $L_{m,n}^{(i)}$ denotes a logical variable when a fiber-optic signal at a time (t−m) and a location (d−n) is determined to be a vibration of category i in Step 4, Calculation Equation: $s^{(c)} = \sum_{b=1}^{B} J_b(L) s_b^{(c)}$, (Equation 10)

where, in Equation 10, $s^{(c)}$ denotes a score on the basis of the whole logical equations in the logical rule base when the current vibration belongs to category c, the input L in $J_b(L)$ configures all the logical variables $L_{m,n}^{(i)}$, the subscript b denotes the b-$^{th}$ logical equation, and $s_b^{(c)}$ denotes a contribution degree to a score in each vibration category when the logical equation $J_b(L)$ is established, Vibration category corresponding to a highest score: (Equation 11)

$e^*(t, d) = \text{argmax}_c s^{(c)}$.

4. The method for detecting and specifying a vibration on the basis of a feature of a fiber-optic signal to determine a time and a spatial location according to claim 3, wherein
in Step 2, the dimensionality reduction matrix is acquired by Principal Component Analysis or Independent Component Analysis.

5. A system for detecting and specifying a vibration on the basis of a feature of a fiber-optic signal to determine a time and a spatial location, comprising:
a feature expansion unit for acquiring a feature-expanded function vector and C-number of vibration categories by expanding a feature of initial data of a vibration signal from a distributed fiber-optic sensor;
a dimensionality reduction matrix calculation unit for calculating a dimensionality reduction matrix based on the feature-expanded function vector;
a linear dimensionality reduction unit for acquiring a dimensionality-reduced feature function by operating the dimensionality reduction matrix to the initial data and the feature-expanded function vector;
a primary classification unit for acquiring a primary classification result of the vibration signal by performing a classification with reference to a primary classification parameter acquired from a parameter database; and
a secondary classification unit for acquiring and outputting a secondary classification result of the vibration signal by performing removal of a wrong detection result and correction of a wrong classification result of the primary classification result, wherein the dimensionality reduction matrix calculation unit collects a training sample set represented by the following Equation 1 for vibration category c;

calculates, for each vibration category, a center of a cluster represented by the following Equation 2, a variance within the cluster represented by the following Equation 3, a sum of variances within clusters represented by the following Equation 4, a center of all the data represented by the following Equation 5, and a variance between clusters represented by the following Equation 6; and calculates a feature value of a matrix represented by the following Equation 7, decomposing the matrix, acquiring Q-number of maximum feature values and corresponding feature vectors, and composing the dimensionality reduction matrix by using columns of the feature vectors, Training sample set: $\{g_1^{(c)}, g_2^{(c)}, \ldots, g_{K_c}^{(c)}\}$, (Equation 1)

where, in Equation 1, $g_k^{(c)}$ denotes a k-$^{th}$ training sample in vibration category c, Center of a cluster: $\bar{g}^{(c)} = \frac{1}{K_c}\sum_{k=1}^{K_c} g_k^{(c)}$, (Equation 2)

where, in Equation 2, Kc denotes the number of training samples in the category c, Variance within the cluster: (Equation 3)

$$S^{(c)} = \sum_{k=1}^{K_c} \left(g_k^{(c)} - \bar{g}^{(c)}\right)\left(g_k^{(c)} - \bar{g}^{(c)}\right)^T,$$

Sum of variances within clusters: $S_\Sigma = \sum_{c=1}^{C} S^{(c)}$, (Equation 4)

where, in Equation 4, C denotes the total number of vibration categories,

Center of all of the data: $\bar{g} = \frac{1}{\sum_{c=1}^{C} K_c}\sum_{c=1}^{C}\sum_{k=1}^{K_c} g_k^{(c)}$, (Equation 5)

Variance between clusters: $S = \sum_{c=1}^{C} K_c(\bar{g} - \bar{g}^{(c)})(\bar{g} - \bar{g}^{(c)})^T$, (Equation 6)

Matrix: $S_\Sigma^{-1} S$. (Equation 7)

6. The system for detecting and specifying a vibration on the basis of a feature of a fiber-optic signal to determine a time and a spatial location according to claim 5, wherein
the parameter database is used to accumulate at least one of the dimensionality reduction matrix, a classifier parameter, and a logical rule base.

7. The system for detecting and specifying a vibration on the basis of a feature of a fiber-optic signal to determine a time and a spatial location according to claim 5, wherein
the secondary classification unit
converts the primary classification result represented by the following Equation 8 to a logical variable represented by the following Equation 9;
calculates, for each vibration category, a score of B-number of whole logical equations $\{J_1(L), J_2(L), \ldots, J_B(L)\}$ in a logical rule base on the basis of a calculation equation represented by the following Equation 10; and
outputs a vibration category corresponding to a highest score represented by the following Equation 11 as an output of a secondary classifier, Primary Classification Result: $e(t, d)$, (Equation 8)

Logical Variable: $L_{m,n}^{(t)} = \begin{cases} 1 & \text{if } e(t-m, d-n) == i \\ 0 & \text{otherwise} \end{cases}$, (Equation 9)

where, in Equation 9, $L_{m,n}^{(i)}$ denotes a logical variable when a fiber-optic signal at a time (t−m) and a location (d−n) is determined to be a vibration of category i in Step 4, Calculation Equation: $s^{(c)} = \sum_{b=1}^{B} J_b(L) s_b^{(c)}$, (Equation 10)

where, in Equation 10, $s^{(c)}$ denotes a score on the basis of the whole logical equations in the logical rule base when the current vibration belongs to category c, the input L in $J_b(L)$ configures all the logical variables $L_{m,n}^{(i)}$, the subscript b denotes the b-$^{th}$ logical equation, and $s_b^{(c)}$ denotes a contribution degree to a score in each vibration category when the logical equation $J_b(L)$ is established, Vibration category corresponding to a highest score: (Equation 11)

$e^*(t, d) = \text{argmax}_c s^{(c)}$.

\* \* \* \* \*